March 18, 1958  A. A. McCORMACK  2,827,226
REFRIGERATION APPARATUS
Filed June 17, 1954  2 Sheets-Sheet 1
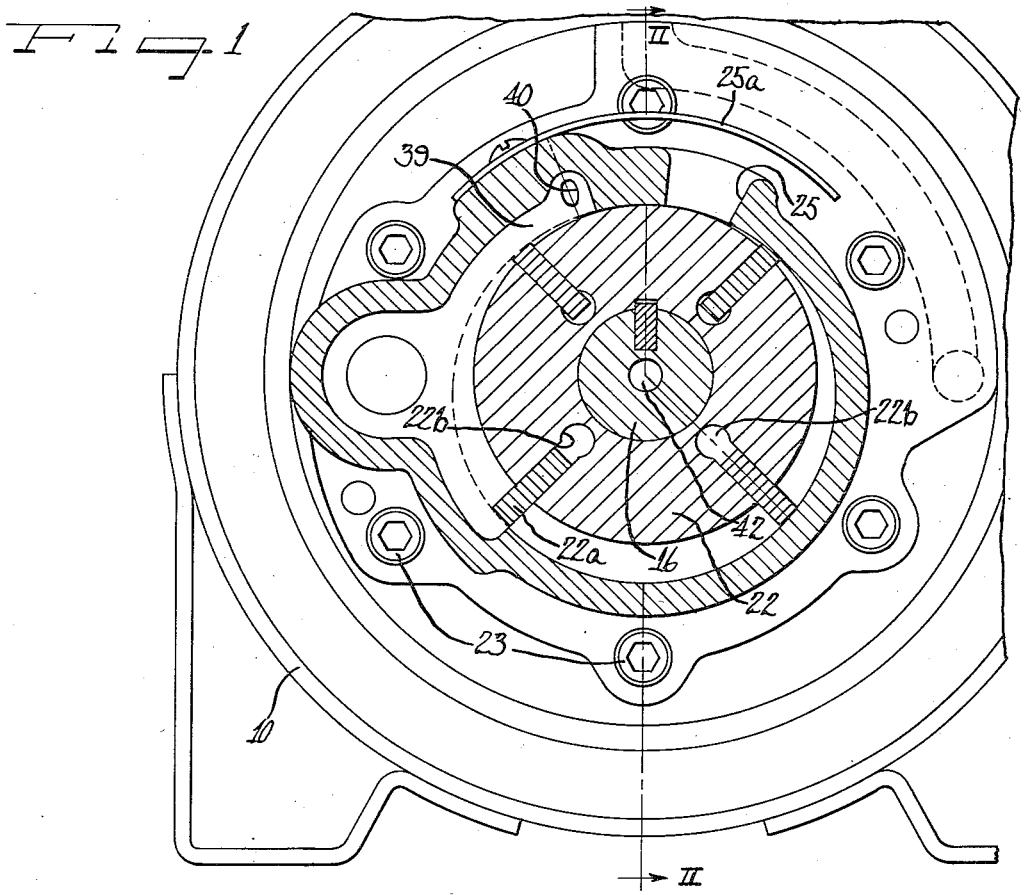
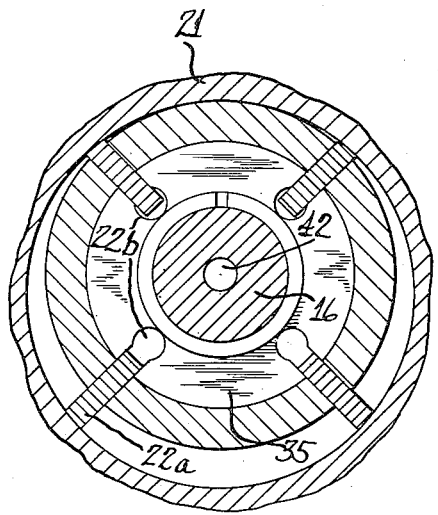
Inventor
Alex A. McCormack
by Hill, Sherman, Meroni, Gross & Simpson

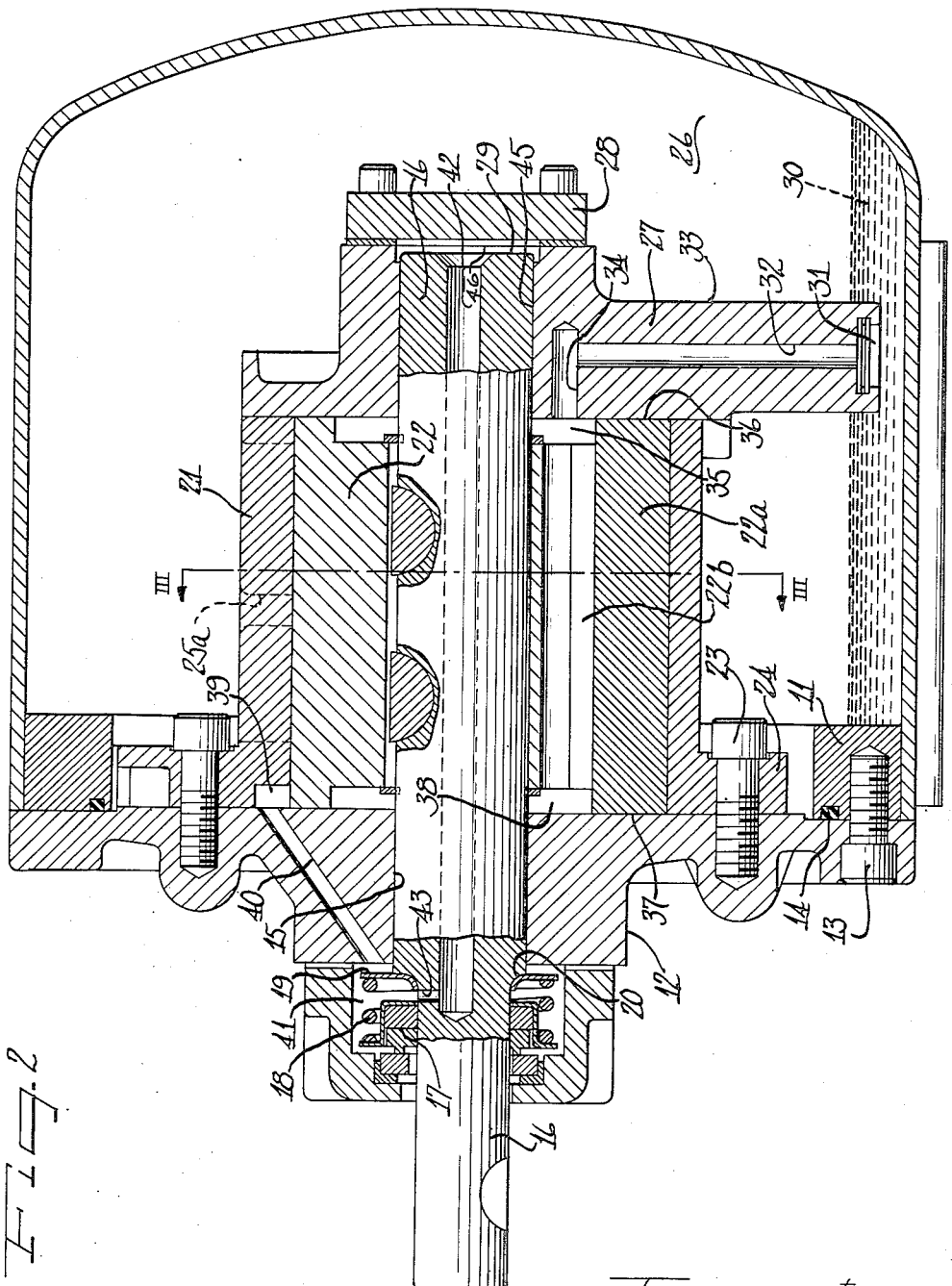

United States Patent Office 2,827,226
Patented Mar. 18, 1958

2,827,226

REFRIGERATION APPARATUS

Alex A. McCormack, Bay Village, Ohio, assignor to Thompson Products, Inc., Cleveland, Ohio, a corporation of Ohio Application June 17, 1954, Serial No. 437,353

1 Claim. (Cl. 230—152)

The present invention relates to a novel and improved compressor structure, and, more particularly, relates to a force feed lubrication system for the compressor unit of an air conditioning system or the like.

Within the last decade, a great deal of research and development work has been instigated in the field of high efficiency, compact, refrigeration equipment. A major impetus for this increased development activity has been the desire to construct an apparatus capable of efficient operation in automobiles. Since the space available for such units in an automobile is extremely limited a major objective of the effort in improvements has been to reduce the size of the compressor and similar units and also to minimize wear and hence maintenance problems.

An important method, in a general sense, of reducing size in pump units or the like, is to substantially reduce the operating friction of the component parts by means of proper lubrication and elimination of axial thrust on the pump shafts. The present invention relates, therefore, to a specific and improved compressor or similar gas pump having a novel force feed lubrication system for the elimination of running wear, and a novel pump shaft thrust control for the prevention of pump rotor wear as a result of excessive end thrust on the shaft. By providing these improved features, it has been possible to minimize the physical size of the compressor components while simultaneously providing a highly efficient compressor unit capable of the high standard of performance absolutely required by the automotive industry.

In accomplishing the above set forth objectives, applicant has provided a low pressure shaft actuator operating to place the inlet or suction pressure of the pump against the pump shaft for the lubrication thereof and has simultaneously provided a novel force feed lubricant system wherein lubricating oil is forced, under a positive pressure, throughout the moving apparatus of the rotary vane pumps.

It is therefore an object of the present invention to provide a novel combined lubricant and refrigerant gas compressor pump.

Another object of the present invention is to provide a novel lubrication system for rotary vaned pumps or the like.

Still another object of the present invention is to provide a novel refrigerant compressor providing, simultaneously, a reservoir settling chamber for the removal of lubricant from the compressed gas, a means for force feeding the lubricant so collected throughout the rotary or otherwise movable parts of the pump, and simultaneously retain the shaft of said pump in axially unloaded condition.

A feature of the present invention is the provision of a pump shaft having an axially extending bore therein for placing an enclosed chamber at one end of the pump shaft under the pump inlet pressure.

Another feature of the present invention is the provision of a novel lubricant system for compressors or the like.

Still a further object of the present invention is to provide a novel fluid pump combined with a gas compressor and wherein the same rotor simultaneously compresses a gas and distributes a liquid lubricant over the moving parts of the pump.

Still another object of the present invention is to provide a novel, compact, and highly efficient compressor having an integral force feed lubrication system for effectively minimizing the operating frictional resistance and without adding bulk to the compressor unit.

Still other and further objects and features of the present invention will become apparent to those skilled in the art from a consideration of the attached drawings wherein—

Figure 1 is an end elevational view in partial cross-section of a preferred embodiment of the present invention;

Figure 2 is a cross sectional view taken along the line II—II of Fig. 1; and

Figure 3 is a further cross sectional view taken along the line III—III of Fig. 2 and illustrating the lubrication of the pump vanes according to the teachings of the present invention.

As shown on the drawings:

As shown in Figs. 1 and 2 an outer housing 10, preferably comprising a sheet metal stamping having welded thereto an internal bolt flange 11, is supported by a bracket and in turn supports a pump mounting end plate 12. The end plate 12 is secured and sealed to the housing 10 by means of a plurality of cap screws 13 and a fluid pressure seal 14 of the O-ring type. The end plate 12 is provided with an axially extending bore 15 for rotatably carrying the pump drive shaft 16. Leakage is prevented from passing from the inside of the housing 10 out along the shaft 16 by means of a conventional seal 17 resiliently maintained in contact with the shaft 16 by means of a spring 18 which is, in turn, supported by the washer 19 resting against the abutment 20 on the shaft 16.

As in the case of conventional vane type pumps, which are in need of unusually effective lubrication, the high pressure outlet of the rotary pump discharges into the space defined by the housing 10. This permits the use of lubricant mixed with the refrigerant or similar gas to be compressed, and its subsequent gravitational settling out in a high pressure settling chamber.

To this end, the subhousing 21 carrying the rotor 22 of the compressor pump is bolted to the end plate 12 by means of bolts 23 passing through the peripheral flange 24. A high pressure outlet 25, provided with a spring check valve 25a, is formed in the subhousing 21 and permits the flow of compressed refrigerant or the like into the settling chamber 26. As may be seen from Fig. 2, the subhousing 21 carries integral therewith, or securely affixed thereto by conventional means, an end plate 27 having in turn a cover plate 28 positioned over the inner end of the shaft 16. The cover plate 28 is hermetically sealed to the end plate 27 and prevents the application of the pressure in the chamber 26 against the end surface 29 of the shaft 16.

In the prior art compressor structures of which I am aware, the shaft corresponding to the rotor shaft 16 has been subjected to the compressor outlet pressure in the chamber 26. This pressure causes the shaft in such conventional pumps to move axially carrying the rotor with its radially movable vanes with it. This axial thrust has a tendency to cause wear in the left hand end face of the rotor thereby providing undesirable looseness and reduced pump efficiency. Further, lubrication has been unsatisfactorily accomplished in such prior art constructions as a result of this improper application of high pressure at the end of the rotor shaft.

The present invention contemplates a novel lubrication system which operates in conjunction with the novel shaft mounting above discussed which eliminates the presence of pressure against the end face 29, to provide adequate lubrication for the bearings at both ends of the shaft 16, as well as the radially reciprocable rotor vanes 22a. This is accomplished by a network of lubricating bores connected to the suction side of the pump and to the pool of lubricant settled out of the compressed refrigerant. Since the pool of lubricant is under a pressure equal to the pressure of the compressor outlet, and since the pump suction pressure is, of course, substantially below that value, a forced lubrication feed system is provided which forces lubricant under a high positive pressure to and in contact with the several bearing surfaces of the pump.

As shown in Fig. 2, a pool of lubricant 30, which has settled from the compressed refrigerant or the like, surrounds the opening 31 of a bore 32 in the downwardly projecting supply pipe 33. While the pipe 33 is shown as integral with the end cap 27, it will of course be understood that it may be constructed of a piece of tubing secured to the end cap 27 at a point adjacent to the shaft 16. The bore 32 connects to a longitudinally extending bore 34 which leads into the annular recess 35 formed in the end face 36 of the rotor 22. The opposite end of the rotor 37 is likewise provided with an annular recess 38.

As may be viewed in Figs. 1 and 2, the suction portion of the rotor subhousing 21 is provided with a segmental cutout 39. In the assembled condition, the cutout portion 39 is connected by means of a bore 40 to the seal chamber 41 at a point inside the seal 17. The shaft 16 is provided with a longitudinally extending bore 42 which emerges from the end of the shaft at the end face 29 and is provided at its opposite end with a radially extending bore 43 in communication with the seal chamber 41 and hence with the cutout portion 39 of the suction side of the pump rotor.

As a result of the above identified and outlined construction, a sump, or low pressure area 39 is provided, to which fluid may flow and a source of lubricant under high pressure is provided at the port 31. As a result, the annular recesses 35 and 38, which are connected to each other by means of the axially extending grooves 22b, are provided with lubricant under a high positive pressure. This lubricant is then drawn over the shaft bearing surfaces 15 and 45 by means of the differential in pressure which exists between the annular recesses 35 and 38 and the sump 39. As will be apparent from a consideration of Fig. 2, the end face 29 of the shaft 16, and the chamber 46 formed between the end face and the end plate 28, as well as the seal chamber 41, will be under the sump or pump suction pressure and lubricant will be forced from the annular recess 35 to the chamber 46 and from the recess 38 to the chamber 41 by means of the differential in pressure.

In ordinary operation the compressor, when used in a refrigerant cycle, is under a slight suction pressure. The application of this pressure to the chamber 46 will, of course, cause the shaft 16 to tend to move toward the left as viewed in Fig. 2. However, this left-hand movement is opposed by the spring 18 which acts against the washer 19 and the abutment 20. This combination of forces provides a substantially axially balanced, rotor shaft 16 which will apply only insignificant loads axially on the shaft 16. This permits the elimination of heavy duty thrust bearings on the shaft 16, and at the same time substantially eliminates the possibility of excessive wear occurring in the end faces of the rotor 22.

It will thus be seen that I have provided a novel compressor or pump wherein all of the rotating parts are adequately lubricated by a highly effective force feed lubricant system operated simultaneously with and by operation of the compressor rotor during its regular pumping operation. In effect, therefore, the pump of the present invention operates simultaneously as a refrigerant or the like compressor and as a lubricant pump without at the same time requiring additional pumping chambers or vanes for accomplishing this twofold purpose. By providing this combined action it is possible to utilize an extremely small and compact compressor unit capable of handling heavy duty pumping requirements in which lubrication is absolutely essential.

It will, of course, be understood that the pump or compressor of the present invention is not intended to be limited to use as a compressor for refrigerants, but may, instead, be utilized throughout a wide range of compressor tasks. Further, other variations and modifications may be made in the structure hereinabove described without departing from the novel concepts of the present invention. It is therefore not my intention to limit the scope of the present invention other than as necessitated by the appended claim.

I claim as my invention:

A combined compressor and forced lubrication system for a lubricant-containing fluid, comprising a rotating drive shaft supported at two spaced points by bearings, a rotor driven by said shaft between said bearings, a compressor casing comprising an annular cam track, radial slots in said rotor, vanes slidable in said slots, annular enclosed reservoirs between the ends of said rotor and said bearings, means passing through said rotor connecting said reservoirs together and simultaneously directing fluid against the radially inner ends of the radially slidable vanes mounted in said rotor, a collecting chamber, means porting the high pressure output of the compressor to said collecting chamber, means providing a sump in said collecting chamber for collecting settled lubricant, means for directing the collected lubricant to said reservoirs and means connecting the sides of said bearings remote from said reservoirs to the inlet of said pump whereby the full pump pressure differential is applied across each of said bearings, said last named means comprising a bore extending longitudinally through said shaft and in fluid communication with said remote sides and said inlet.

References Cited in the file of this patent

UNITED STATES PATENTS

| | | |
|---|---|---|
| 1,558,620 | Kagi | Oct. 27, 1925 |
| 1,897,547 | Buenger | Feb. 14, 1933 |
| 1,928,300 | Peltier | Sept. 26, 1933 |
| 1,971,448 | Hapgood | Aug. 28, 1934 |
| 2,057,381 | Kenny et al. | Oct. 13, 1936 |
| 2,299,931 | Saad | Oct. 27, 1942 |
| 2,305,317 | Nickell | Dec. 15, 1942 |
| 2,643,817 | Makaroff et al. | June 30, 1953 |